July 15, 1941.     P. KOLLSMAN                 2,249,530
                   SHOCK ABSORBER
              Filed July 20, 1939          3 Sheets-Sheet 1
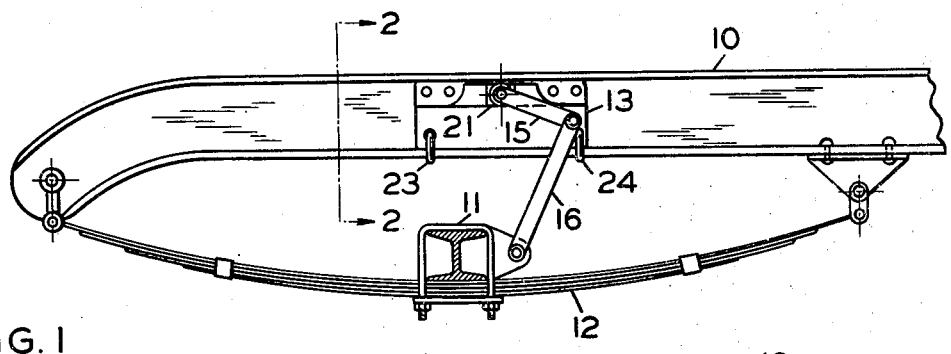
FIG. 1
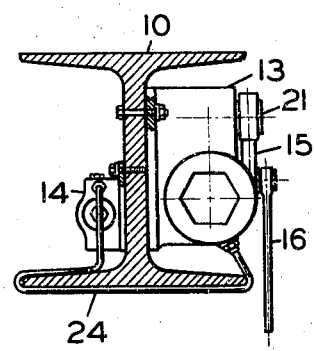
FIG. 2
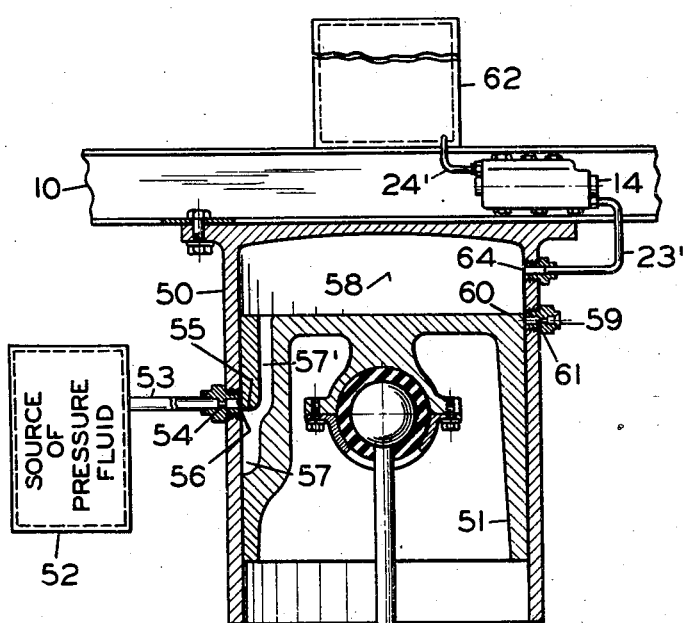
FIG. 4
INVENTOR
PAUL KOLLSMAN
BY 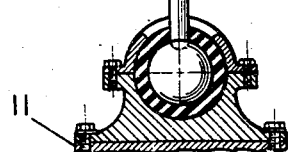
his ATTORNEY

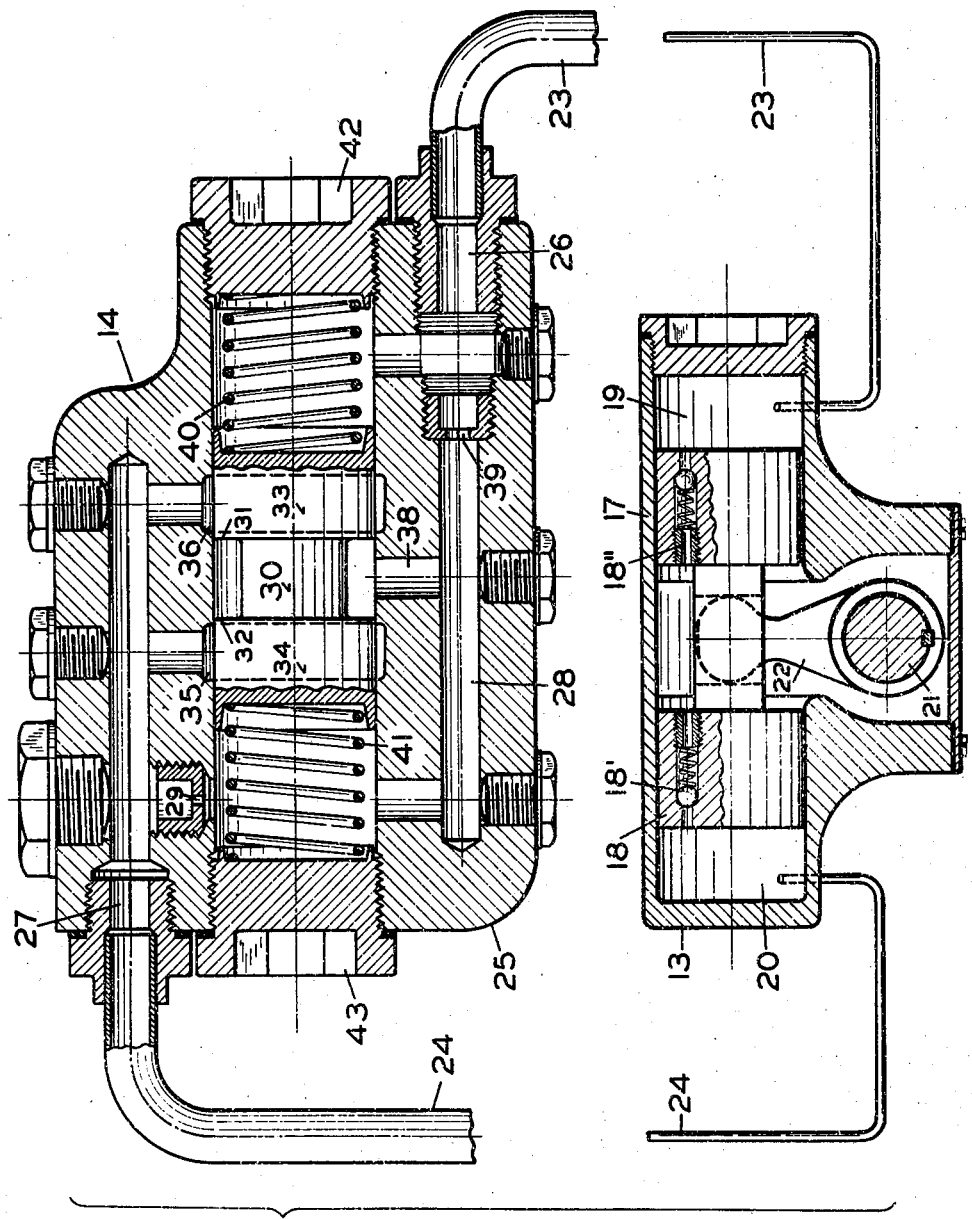

July 15, 1941. P. KOLLSMAN 2,249,530
SHOCK ABSORBER
Filed July 20, 1939 3 Sheets-Sheet 3

INVENTOR
PAUL KOLLSMAN
BY
his ATTORNEY

Patented July 15, 1941

2,249,530

UNITED STATES PATENT OFFICE 2,249,530

SHOCK ABSORBER

Paul Kollsman, New York, N. Y.

Application July 20, 1939, Serial No. 285,490

26 Claims. (Cl. 267—8)

This invention relates to pressure fluid operated devices, more particularly to devices for the control of movements between relatively movable parts, such as, for example, the wheels and the body or chassis of an automobile or a railroad car or, in general, between a suspended body and its support.

Devices of this character are generally called "shock absorbers" although for the purpose of this description the term "shock absorber" is understood to include devices which resiliently support, and control the movement of, a movable body or member, such as the so-called "air cushions" or "air springs."

It is an object of this invention to provide a shock absorber which will offer little resistance to sudden shocks or disturbances and an increased resistance to disturbances of a slower nature.

Referring for purposes of illustration to an application of this invention to automobiles, it is an object of this invention to provide a shock absorber which will premit the wheels of the car rapidly to follow sudden irregularities of the road such as "ripples" in a "washboard road" or sudden bumps without transmitting shocks resulting therefrom to the body, but which will offer increased resistance and damping to movements of a slower nature such as rocking or dipping of the body relatively to the wheels or tilt of the body in a curve caused by centrifugal force.

It is thus an object of this invention to provide an improved shock absorber which will differently respond to irregularities of the road of different nature and maintain the suspended body stable by permitting movements of the wheels of a vehicle to adapt themselves to the nature of the irregularities of the road.

It is a further object of this invention to provide a shock absorber which is responsive to the rate of a relative movement impressed on the same.

More particularly, it is an object of this invention to provide an improved shock absorber, the damping action of which is inversely proportional to the rate of a relative movement between the parts to which the shock absorber is connected.

It is a further object of this invention to provide a pressure fluid operated shock absorber in which the flow of a displaced body of pressure fluid is restricted in response to the rate of a relative movement impressed on the shock absorber.

It is another object of this invention to provide, in a pressure fluid operated shock absorber, means for deriving an impulse for controlling the damping action of the shock absorber from the rate of flow of the pressure fluid.

The invention further aims at providing a shock absorber which will resiliently support and dampen the movement of a suspended body in response to the rate at which disturbances act on the body.

Further aims, objects and advantages of this invention will appear from a consideration of the description which follows with accompanying drawings showing for purely illustrative purposes embodiments of this invention. It is to be understood, however, that the description is not to be taken in a limiting sense, the scope of this invention being defined in the appended claims.

Referring to the drawings:

Fig. 1 shows in elevation a shock absorber according to the present invention installed on a chassis of an automobile;

Fig. 2 is a section on line 2—2 of Fig. 1;

Fig. 3 is a longitudnial cross-section through the control valve and cylinder of the shock absorber shown in Figs. 1 and 2;

Fig. 4 is a diagrammatic illustration of a shock absorber capable of resiliently supporting and controlling the movements of a movable load.

Figure 5:
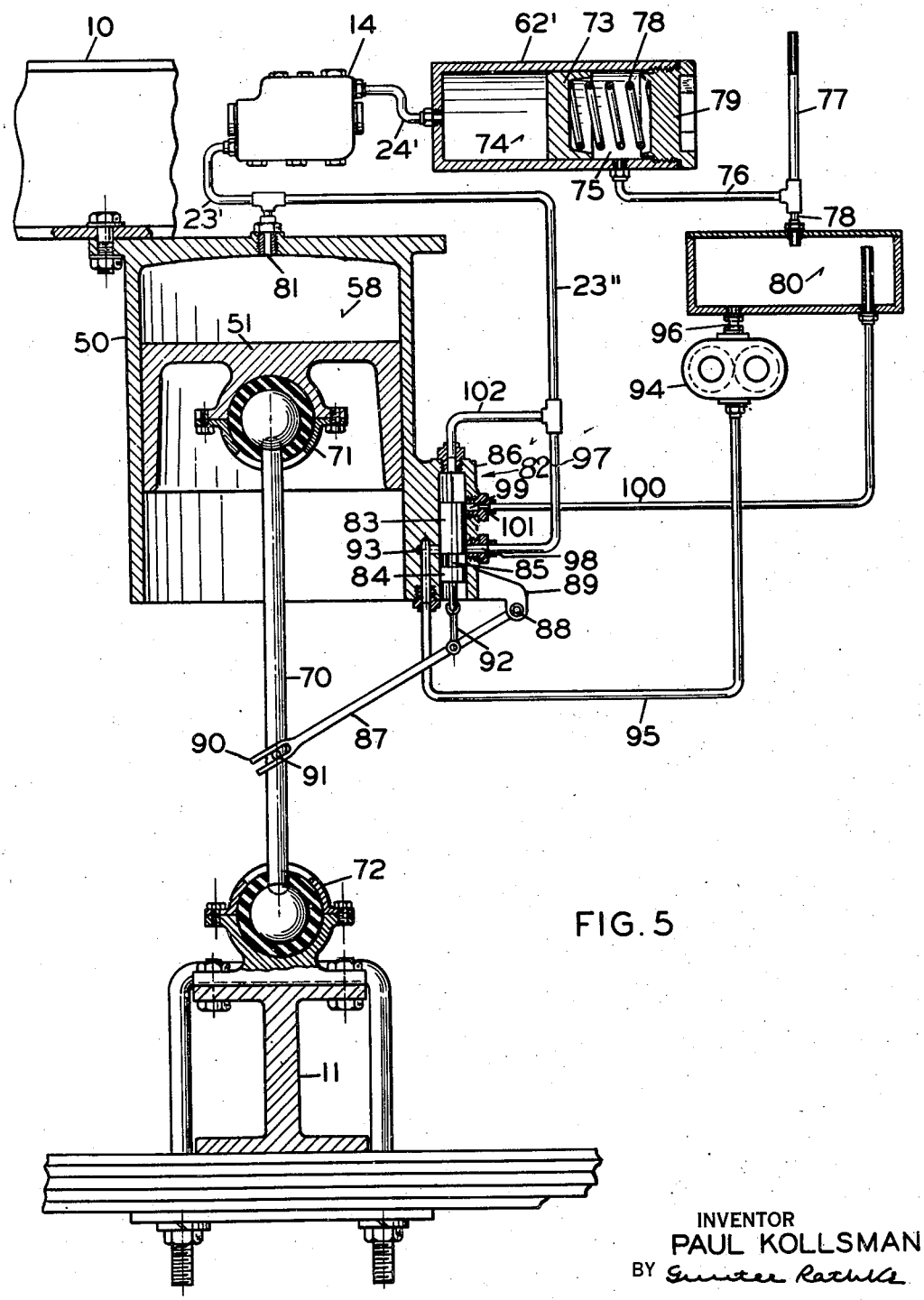
Fig. 5 is a modified form of the device shown in Fig. 4.

The structure and operation of devices according to the present invention may conveniently be explained by reference to an illustrated device shown in Figs. 1 to 3 in which the shock absorber is shown as installed on the chassis of an automobile, it being understood that the present invention is not limited to the illustrated form or use.

A shock absorber device according to this invention broadly consists of two members movable relatively to each other and arranged to displace through a passage a body of pressure fluid which may be compressible or non-compressible, in combination with means for controlling the flow of fluid through said passage. The members adapted to displace a body of pressure fluid may be of any convenient form and may, more particularly, have the form of a bellows or a cylinder and piston movable therein. In the drawings a device of the cylinder and piston type is shown.

Referring to Figs. 1 and 2, the chassis 10 of a vehicle is supported on an axle 11 by means of a spring 12. A shock absorber is shown in the illustrated embodiment as comprising a cylinder and piston arrangement 13 and a control valve mechanism 14, the detailed structure of which will be later described. The shock absorber is secured to the chassis 10 and is connected to the axle 11 by means of an arm 15 and a link 16.

The cylinder and piston arrangement 13 is shown in greater detail in Fig. 3 and includes a cylinder housing 17 enclosing a movable piston 18 separating the cylinder space into chambers 19 and 20. To a shaft 21 rotatable in the housing is rigidly connected the lever arm 15 and an arm 22 engaging the piston 18. The chambers 19 and 20 are connected through a passage shown in the illustrated embodiment as formed by conduits 23 and 24 into which the control valve mechanism 14 is connected. If the shaft 21 is rotated due to a movement impressed on the shock absorber, a body of pressure fluid will be displaced out of one of the chambers 19 or 20 into the other.

Safety valves having, in the illustrated embodiment, the form of spring loaded steel balls and closing a relief passage, may be provided in the piston at 18' and 18". These relief valves prevent the pressure within the chambers 19 and 20 from assuming an abnormally high value should the passage between the chambers be accidentally interrupted or closed.

According to the present invention fluid flow restricting means are provided in the passage through which pressure fluid is forced and the flow resistance of the flow restricting means is varied in response to the rate of the movement impressed on the shock absorber. The movement impressed on the shock absorber appears in the illustrated embodiment as the relative movement between the piston 18 and the cylinder 17.

Very conveniently, a control impulse, proportional to the rate of movement, may be derived from the flow of the displaced pressure fluid.

A suitable device for restricting the flow of fluid between the chambers 19 and 20 and for controlling the flow resistance of said means is shown in greater detail in Fig. 3 and will now be described.

A valve housing 25 is provided with passages or channels 26 and 27 which, depending on the direction of the flow of fluid through the conduits 23 and 24 connected thereto, will constitute inlet or outlet passages, respectively. The passages 26 and 27 communicate through a further channel 28 thus permitting pressure fluid displaced from one of the cylinder chambers of the shock absorber to flow into the other.

Fluid flow restricting means are provided in the passage through which the pressure fluid flows. In the illustrated embodiment, the flow restricting means is shown in the form of a relatively narrow constriction 29 of the orifice type. The size of this constriction determines the resistance offered by the shock absorber to a movement impressed thereon and, accordingly, determines the damping action of the shock absorber.

According to the invention the resistance of the fluid flow restricting means is varied in response to the rate of movement impressed on the shock absorber.

The change of resistance may be accomplished in any convenient manner such as by varying the size of the constriction. In the present embodiment, however, the size of the constriction 29 is maintained constant and a by-pass provided across the constriction, the by-pass being controlled by a valve.

In the embodiment shown in Fig. 3, the valve includes a movable valve member having a reduced center portion 30 terminated by control edges 31 and 32 and cylindrical portions 33 and 34. Control ports 35 and 36 are provided in the valve housing, associated with the control edges 31 and 32 and the cylindrical portions 33 and 34. Ports 35 and 36 communicate with passage 27 while a further port 38 communicates with passage 28. In the position shown in the drawing, ports 35 and 36 are closed by the cylindrical portions 33 and 34 of the valve member. If the valve member is moved in one or the other direction, passage 28 and its port 38 will be gradually brought into communication with passage 27, through one of the ports 35 or 36 thus by-passing the constriction 29 and reducing the resistance of the shock absorber.

As hereinbefore stated the resistance of the fluid flow restricting means is varied in response to the rate of a movement impressed on the shock absorber. A control impulse for adjusting the fluid flow restricting means, in the illustrated embodiment the by-pass valve, may conveniently be derived from the rate of flow of the fluid.

For this purpose a second constriction is provided in the passage between the two chambers of the shock absorber. This constriction may also assume the form of an orifice 39 and be relatively large as compared to the size of the constriction 29.

According to a well known law of physics, the differential pressure across a constriction through which a flow of fluid passes is proportional to the rate of such flow. Accordingly, differential pressure responsive means may be provided which are responsive to the difference in pressure across the constriction 39.

In the present embodiment the differential pressure responsive means is formed by the cylindrical portions 33, 34 of the valve member proper. The cylindrical portion 33 is acted upon by the pressure on one side of the constriction 39 while the cylindrical portion 34 is acted upon by the pressure on the other side of the same constriction.

Resilient means are provided for maintaining the valve member in a nuetral position in which ports 35 and 36 are closed. In the illustrated embodiment, helical springs 40 and 41 are shown for this purpose which bear against the valve member with one end and against threaded plugs 42 and 43 with the other which tightly seal the valve housing.

The force of springs 40 and 41 and the length of the stroke during which the valve member may travel without opening one of the ports 35 and 36 to communicate with port 38 may be selected according to the specific requirements under which the shock absorber is to operate.

If the springs are relatively weak and the length of that part of the stroke during which the by-pass valve remains closed is relatively short, the shock absorber will offer less resistance to movements of an increased rate than if the springs were strong and that part of the stroke relatively long during which the valve remains closed.

The operation of the device is as follows:

It may be assumed that a movement be impressed upon the cylinder and piston arrangement in such direction that pressure fluid is forced from the chamber 19 into the chamber 20. Under these conditions the passage 26 constitutes an inlet and the passage 27 an outlet.

Assuming further that the movement impressed on the shock absorber be relatively slow, it easily appears that the flow of fluid passing through the orifice 39 is also relatively slow and the differential pressure created at the constriction small. In response to a small differential pressure the valve member will only be displaced a short distance, but not sufficiently to by-pass the constriction 29, which thus offers considerable resistance to the flow of fluid. Under these conditions, the shock absorber will offer great resistance to the movement impressed on it resulting in a strong damping of the movement.

It may now be assumed that the movements impressed on the shock absorber are relatively rapid, such as it happens when an automobile passes over a so-called "washboard road" having many irregularities or "ripples" in the road surface. Due to the rapid displacement of pressure fluid from one chamber of the shock absorber into the other, the rate of the flow of fluid through the passage connecting the two chambers of the shock absorber is considerably increased, thereby increasing the differential pressure across the constriction 39. Due to the increase in differential pressure, the valve responds, opening to some extent the port 36 to by-pass the constriction 29.

If the direction of the movement impressed on the shock absorber is such that the passage 26 forms an inlet, the greater pressure exists in front of the constriction 39 and a greater pressure will act on the cylindrical portion 33 of the member and a reduced pressure will act on the cylindrical portion 34 as hereinbefore explained. In response to this differential pressure, the valve will be moved in a direction to open the port 36 thus establishing a by-pass across the constriction 29.

If the flow of fluid occurs in the opposite direction, a greater pressure will act on the cylindrical portion 34 of the valve, thereby causing the valve to move in a direction to open the port 35. Port 35 is now brought into communication with port 38 and again the constriction 29 is by-passed. The greater the differential pressure, the greater will be the movement of the valve and the lesser the resistance offered by the shock absorber to a movement impressed on the same.

On a "washboard road," accordingly, the wheels of an automobile will be permitted freely to follow the irregularities of the road, while the body or chassis of the car remains unaffected since the shock absorber due to its reduced resistance will not transmit the rapid movements of the wheel to the same.

A modified form of the invention is diagrammatically shown in Fig. 4 in which a shock absorber is illustrated capable of supporting as well as controlling the movements of a supported body.

In the illustrated embodiment, an air spring is provided between the chassis 10 and the axle 11. The air spring may be formed by any suitable expansible and collapsible chamber such as a bellows or the like. In the illustrated embodiment, the air chamber is formed by a cylinder 50 connected to the chassis 10 and a piston 51 connected to the axle 11. A charge of compressible pressure fluid such as air is supplied into the cylinder from a suitable source such as a compressor 52 through a conduit 53 which may be provided with a constriction 54.

The supply of air through the conduit 53 is controlled in movements to the relative position of the cylinder and piston. In the illustrated embodiment the control means include a control edge 55 on the piston, the control edge cooperating with a control port 56 at which conduit 53 terminates. The piston may be provided with a passage 57, 57' admitting air from the control port into the cylinder chamber 58.

In the position shown in the drawings, the supply of air into the cylinder chamber 58 is shut off. Continued supply of air into the cylinder chamber as it occurs when the passage 57 is opposite the port 56 will cause an increase in pressure in the cylinder forcing the piston downwardly and gradually shutting off the supply of air.

Air from the cylinder chamber 28 is permitted to escape through a constricted bleeder port 59. The discharge of air through this port may also be controlled in response to the relative position of the cylinder and piston.

The discharge control may be accomplished in a convenient manner by providing the cylinder with a control edge 60 cooperating with a control port 61 at which the discharge conduit terminates.

If due to an increase in pressure inside the cylinder chamber the piston is moved downwardly, the discharge conduit 59 is opened and air permitted to escape until the piston is moved into a position in which the discharge conduit is again shut off.

The operation of the device so far described is as follows:

If due to an increase in load, the piston is moved into the cylinder, air is supplied through the supply conduit 53 until the piston reaches the position which is shown in the drawing in which both the supply and the discharge conduits are closed. If the load to be supported by the cylinder is decreased causing an expansion of the air in the chamber 58, the piston is forced outwardly, the supply of air shut off and the discharge conduit opened until the piston again assumes the normal position. It thus appears that irrespective of the magnitude of the load, the body of the vehicle will always assume the same position relatively to the axle or wheels.

For the purpose of increasing the resiliency of the air cushion without the necessity of making the cylinder chamber 58 unduly large, a storage chamber 62 may be provided communicating with the cylinder chamber through a conduit 23', 24'. The conduit 23' suitably terminates at a point in the cylinder below the highest position which the piston may assume thus permitting the piston to close the conduit 23' by means of the control edge 60 if due to an excess in load, an exceedingly hard shock or a failure of the air supply, the piston is moved towards its uppermost position.

When passing the port 64 which the conduit 23' forms in the cylinder wall a residual volume of air will be trapped in the cylinder which acts as a safety cushion and prevents metallic contact between the cylinder and piston.

For the purpose of damping the resilient action of the air in the cylinder chamber 58, a constriction may be provided in the conduit connecting the cylinder chamber with the storage chamber. Upon a sudden increase in load, a shock or the like, a rapid increase in pressure will be created within the cylinder chamber which is gradually diminished as air flows into the storage chamber through the constriction.

According to the present invention, the resistance of the constriction within the conduits 23', 24' is controlled in response to the rate of a relative movement between the chassis and the axle or the cylinder and piston respectively. The magnitude of the resistance may be conveniently varied by providing an adjustable by-pass to a fixed constriction, the by-passing being controlled in response to the rate of the movement between the cylinder and piston. A control impulse may again be derived from the rate of flow of the air passing through the conduit 23', 24'.

In the illustrated embodiment a control valve mechanism 14 is provided offering a variable resistance to a flow of air through the conduit 23', 24'. The valve mechanism is shown in detail in Fig. 3.

The operation of the device shown in Fig. 4 is as follows:

Upon a slow movement of the piston relatively to the cylinder caused by a gradual increase in load or by slight irregularities in the surface of the road, the air inside the cylinder chamber is compressed and thus caused to flow into the storage chamber in which temporarily a lower pressure exists. The flow through the conduit 23', 24' is relatively slow thus causing the by-pass valve to remain in its closed position. The constriction 29 in the connection between the cylinder chamber and the storage chamber will thus offer considerable resistance to the flow of compressed air into the storage chamber and only permit a slow movement of the piston.

If a sudden shock acts on the device forcing the piston into the cylinder, the pressure differential between the cylinder chamber and the storage chamber will be relatively great resulting in a rapid flow of air into the storage chamber. Due to the increase in the rate of flow through the conduit 23', 24', a great differential pressure will be built up across the constriction 39 at the control valve mechanism and the control valve will open thus permitting the flow of air to pass into the storage chamber at a decreased resistance.

The source of pressure 52 is protected against sudden fluctuations in air pressure in the cylinder chamber by the same constriction 54 which also serves to control and limit the supply of air. The constriction 54, may, however, be omitted if the source of air is constructed to deliver only a relatively constant and small quantity of air.

In Fig. 5 a further embodiment of the invention is shown adapted for resiliently supporting a load and also for controlling movements of the load with respect to its support. The device illustrated in Fig. 5 may be operated with compressible and non-compressible pressure fluid, but is primarily designed for the latter. Corresponding reference numerals are used to designate corresponding parts. In the illustrated embodiment, an expansible and collapsible chamber is again shown as a cylinder and a piston movable therein, it being understood that any suitable equivalent such as a bellows or the like may be substituted therefor.

A cylinder 50 carries a load which may be a chassis 10. Movable within the cylinder and forming a chamber 58 therewith is a piston 51 connected to a support or axle 11 through a piston rod 70. The piston rod is shown as having resilient rubber bearings 71 and 72 at the piston and axle respectively. The cylinder chamber communicates through conduits 23', 24' with a storage chamber 62'. In order to obtain resiliency with a non-compressible pressure fluid, a movable piston 73 is arranged within the storage cylinder 62 separating the cylinder space into a chamber 74 containing pressure fluid and a chamber 75 vented to the atmosphere through conduits 76 and 77. The piston 73 is loaded to maintain the fluid within chamber 74 under pressure, a spring 78 being shown for this purpose. The spring 78 bears with one end against the piston 73 and with its other end against a closure or cap 79 sealing the cylinder 62'.

Pressure fluid leaking past the piston is drained through conduit 76 and a further conduit 78 into a sump 80. Fluid flow restricting means are provided between the cylinder chamber 58 and the storage chamber 74, the flow resistance of the restricting means being controlled in response to the rate of a relative movement between the piston 51 and the cylinder 50. In the illustrated embodiment a control valve mechanism 14 is shown, illustrated in detail in Fig. 3 and including a constriction 29. The flow resistance of the constriction may be varied in the hereinbefore described manner by by-passing means operated in response to the rate of a movement impressed on the shock absorber.

Fluid under pressure is supplied into the cylinder chamber 58 at 81 through a conduit 23''. The supply of pressure fluid is again controlled in response to the relative position of the cylinder 50 and piston 51.

In the illustrated embodiment a valve 82 is provided including a valve member having cylindrical portions 83, 84 and a reduced portion 85. The valve member is movable in a space within the valve housing 86 which may be formed as part of the cylinder structure 50.

For controlling the valve in response to the relative position between the cylinder and piston, a control arm 87 is shown in the illustrated embodiment pivotally mounted at 88 to a bracket 89 on the valve housing engaging with its forked end 90 a pin 91 on the piston rod and actuating the valve member through a link 92 connected to the arm at a point intermediate the fork and the pivot 88.

The valve has a supply port 93 connected to a source of pressure, in the illustrated embodiment a pump 94, through a conduit 95, the pump drawing pressure fluid from the sump 80 through a conduit 96. A supply conduit 97 communicating with the conduit 23'' is connected to a further port 98 of the valve 82.

A discharge port 99 communicating with a discharge conduit 100 through a constriction 101 permits a discharge of pressure fluid from the cylinder space 58 through conduit 23'' and a further conduit 102 into the sump 80.

The operation of the device so far described is as follows:

When pressure fluid is supplied from the source 94, fluid will flow through lines 95, port 93, port 98, line 97, 23'' into the cylinder chamber 58 thus moving the piston in a downward direction. Fluid will further flow through the conduit 23', the control valve mechanism 14 and the conduit 24' into the storage chamber 74 moving the piston 73 against the action of the spring 78. A pressure will thus be built up within the storage chamber which is equal to the pressure within the cylinder chamber 58.

When the piston arrives at the position shown in the drawings, the cylindrical portion 83 of the valve will close the supply port 93 thus stopping a further supply of pressure fluid. If an increase in the load occurs or if the support 11 is subjected to a sudden shock, the piston will tend to move farther into the cylinder thus increasing the pressure of the fluid in the cylinder chamber 58 which causes a flow of fluid through the constriction 29 in the control valve mechanism 14 to increase the pressure in the storage chamin pressure, the piston 73 will move resulting in ber 74 accordingly. In response to the increase a resilient or yielding movement of the piston 51 with respect to the cylinder.

Assuming again that the increase in load is gradual, the corresponding increase in pressure within the cylinder chamber 58 will be slow and gradual. The means responsive to the rate of flow through conduits 23', 24' will respond little or not at all keeping the by-pass valve closed and causing the full resistance of the constriction 29 to oppose the flow of fluid into the storage chamber.

Assuming on the other hand that the increase in load is sudden that a shock acts on the device causing a rapid increase in pressure within the cylinder chamber 58 and a corresponding rapid flow of fluid towards the storage chamber 73, the rate of flow responsive means will operate to decrease the flow resistance between the cylinder and the storage chambers.

Thus the resiliency of the shock absorber is again a function of the rate of a relative movement impressed on the same.

Should the load on the device be decreased causing a flow of fluid from the storage chamber into the cylinder chamber,—the flow resistance again being a function of the rate of change in load—the piston 51 will be moved in a downward direction causing the cylindrical portion 83 of the valve to open the discharge port 99 to permit pressure fluid to be discharged through the constriction 101 and the conduit 100 into the sump 80. The discharge of fluid continues until a condition of equilibrium is reached when the pressures inside the storage and cylinder chambers are equal and the piston 51 has reached the normal position in which the control valve 82 will close the discharge port 99.

Obviously, the present invention is not restricted to the embodiments herein shown and described. Moreover, it is not indispensible that all the features of this invention be viewed conjointly since they may advantageously be embodied into various combinations and sub-combinations.

In the claims, the term "cylinder and piston" is understood as covering any equivalent of an expansible and collapsible chamber such as a bellows and the like.

What is claimed is:

1. In a shock absorber the combination with a first member; a second member movable relatively thereto and arranged to displace in response to such movement through a passage a body of pressure fluid; and fluid flow restricting means in said passage; of means responsive to the rate of relative movement between said first and second member and connected to vary the flow resistance of said restricting means in response to such rate of movement.

2. In a shock absorber the combination with a first member; a second member movable relatively thereto and arranged to displace through a passage a body of pressure fluid in response to such movement; and fluid flow restricting means in said passage; of a valve connected to by-pass said flow restricting means; and means responsive to the rate of relative movement between said first and second member and connected to said valve to adjust said valve in response to such rate of movement.

3. In a shock absorber the combination with a first member; a second member movable relatively thereto and arranged to displace in response to such movement through a passage a body of pressure fluid; and fluid flow restricting means in said passage; of means responsive to the rate of flow of fluid through said passage connected to adjust the flow resistance of said restricting means in response to such rate of flow.

4. In a shock absorber the combination with a first member; a second member movable relatively thereto and arranged to displace in response to such movement through a passage a body of pressure fluid; and fluid flow restricting means in said passage; of a valve connected to by-pass said flow restricting means; and means responsive to the rate of flow of fluid through said passage and connected to said valve to adjust said valve in response to such rate of flow.

5. In a shock absorber the combination with a first member; a second member movable relatively thereto and arranged to displace in response to such movement through a passage a body of pressure fluid; and fluid flow restricting means in said passage; of a constriction in said passage; and a pressure responsive element connected to be acted upon by a pressure differential across said constriction, said pressure responsive element being connected to vary the flow resistance of said restricting means.

6. In a shock absorber the combination with a first member; a second member movable relatively thereto and arranged to displace in response to such movement through a passage a body of pressure fluid; and fluid flow restricting means in said passage; of a valve connected to by-pass said flow restricting means; a constriction in said passage; and a pressure responsive element connected to be acted upon by a pressure differential across said constriction, said pressure responsive element being connected to operate said valve.

7. In a shock absorber the combination with a first member; and a second member movable relatively thereto and arranged to displace in response to such movement through a passage a body of pressure fluid; of a first constriction in said passage; a second constriction in said passage of lesser flow resistance than said first constriction; a valve connected to by-pass said first constriction; and a pressure responsive element connected to be acted upon by a pressure differential across said second constriction, said pressure responsive element being connected to operate said valve.

8. In a shock absorber the combination with a first member; and a second member movable relatively thereto and arranged to displace in response to such movement through a channel a body of pressure fluid; of a valve connected in said channel, said valve comprising a housing having an inlet and an outlet passage, a cylindrical space, and control ports communicating with said inlet and outlet passage, respectively, and terminating at said cylindrical space; a piston movable in said space, said piston having control edges associated with said ports, the inlet and outlet passage communicating with the space on either side of said piston, respectively; resilient means for biasing said piston towards a normal position, said ports and edges being so positioned that in the normal position the ports are closed and upon movement of said piston an inlet and an outlet port is brought into communication; a first orifice member establishing a restricted connection between the spaces on either side of said piston; and a second orifice member in one of said passages.

9. In a shock absorber the combination with a first member; and a second member movable relatively thereto and arranged to displace in response to such movement through a passage a body of pressure fluid; of a valve connected in said passage, said valve comprising a housing having an inlet and an outlet passage, a cylindrical space and three control ports terminating at said cylindrical space, one of said ports communicating with one, two of said ports communicating with the other of said passages; a piston movable in said space, said cylinder having a reduced center portion and control edges associated with said ports and normally closing said two ports, the inlet and outlet passage communicating with the space on either side of said piston, respectively; a spring on either side of said piston tending to maintain the piston in the normal position in which said two ports are closed; a first orifice member establishing a restricted connection between the spaces on either side of said piston; and a second orifice member in one of said passages.

10. A shock absorber comprising, in combination a cylinder; a piston movable therein and dividing the cylinder into two chambers; a charge of pressure fluid in said chambers; a conduit connecting said two chambers; a flow restricting member in said conduit; and means responsive to the rate of flow of fluid through said conduit, said means being connected to vary the flow resistance of said member in response to such rate of flow.

11. A shock absorber comprising, in combination, a cylinder; a piston movable therein and dividing the cylinder into two chambers; a charge of pressure fluid in said chambers; a conduit connecting said two chambers; a first flow restricting member in said conduit; a valve connected to by-pass said first restricting member; a second flow restricting member in said conduit; and a differential pressure responsive element connected to be acted upon by a differential pressure across the constriction and connected to actuate said valve.

12. A shock absorber comprising, in combination, a cylinder; a piston movable therein; a source of fluid under pressure; first control means responsive to the relative position of said cylinder and piston connected to admit pressure fluid from said source into said cylinder in response to such relative position; a constricted passage; second control means responsive to the relative position of said cylinder and piston connected to vent pressure fluid from said cylinder through said passage; a storage chamber adapted to store fluid under pressure; a constricted conduit connecting said cylinder to said storage chamber; and means responsive to the rate of flow of fluid through said conduit and connected to vary the flow resistance of said conduit in response to such rate of flow.

13. A shock absorber comprising, in combination, a cylinder; a piston movable therein; a source of fluid under pressure; first control means responsive to the relative position of said cylinder and piston connected to admit pressure fluid from said source into said cylinder in response to such relative position; a constricted passage; second control means responsive to the relative position of said cylinder and piston connected to vent pressure fluid from said cylinder through said passage; a storage chamber adapted to store fluid under pressure; a conduit connecting said cylinder to said storage chamber; a first and a second constriction in said conduit; a valve connected to by-pass said first constriction; and differential pressure responsive means connected to be acted upon by a difference in pressure across said second constriction, said pressure responsive means being connected to actuate said valve.

14. A shock absorber, comprising, in combination, a cylinder, a piston movable therein; a source of air under pressure; a constricted first conduit connecting said source and said cylinder; first control means responsive to the relative position of said cylinder and piston connected to control the flow of air through said first conduit in response to such relative position; a constricted second conduit; second control means responsive to the relative position of said cylinder and piston connected to control the discharge of air through said second conduit in response to such relative position; a storage chamber adapted to store air under pressure; a third conduit connecting said chamber and said cylinder; flow restricting means in said third conduit; and means responsive to the rate of flow through said third conduit and connected to vary the flow resistance of said restricting means in response to such rate of flow.

15. A device as claimed in claim 14 in which said third conduit is connected to said cylinder at a point intermediate the extreme positions of the piston, whereby the piston moving past said point will trap a volume of air in said cylinder.

16. A shock absorber, comprising, in combination, a cylinder, a piston movable therein; a source of air under pressure; a constricted first conduit connecting said source and said cylinder; first control means responsive to the relative position of said cylinder and piston connected to control the flow of air through said first conduit in response to such relative position; a constricted second conduit; second control means responsive to the relative position of said cylinder and piston connected to control the discharge of air through said second conduit in response to such relative position; a storage chamber adapted to store air under pressure; a third conduit connecting said chamber and said cylinder; a first and a second constriction in said third conduit; a valve connected to by-pass said first constriction; and differential pressure responsive means connected to be acted upon by a difference in pressure across said second constriction, said pressure responsive means being connected to actuate said valve.

17. A shock absorber comprising, in combination, a cylinder; a piston movable therein; a source of fluid under pressure; a discharge passage; a first control valve connected to be operated in response to the relative position of said cylinder and piston and connected to admit pressure fluid from said source into said cylinder and from said cylinder into said discharge passage; a storage chamber adapted to store fluid under pressure; a conduit connecting said chamber and said cylinder; a constriction in said conduit; a second valve connected to by-pass said constriction; and means responsive to the rate of flow of fluid through said conduit and connected to actuate said second valve.

18. A shock absorber comprising, in combination, a first cylinder, a piston movable therein; a source of liquid under pressure; a discharge passage; a first control valve connected to be operated in response to the relative position of said cylinder and piston and connected to admit liquid from said source into said cylinder and from said cylinder into said discharge passage; a storage chamber including a cylinder and a spring-loaded piston; a conduit connecting said storage chamber and said first cylinder; a first and a second constriction in said conduit; a second valve connected to by-pass said first constriction; and a differential pressure responsive member connected to be acted upon by a difference in pressure across said second constriction and connected to actuate said second valve.

19. In a shock absorber the combination with a first member; a second member movable relatively thereto and arranged to displace in response to such movement through a passage a body of pressure fluid; and fluid flow restricting means in said passage; of means responsive to the rate of relative movement between said first and second member and connected to decrease the flow resistance of said restricting means at an increase in the rate of such movement.

20. In a shock absorber the combination with a first member; a second member movable relatively thereto and arranged to displace through a passage a body of pressure fluid in response to such movement; and fluid flow restricting means in said passage, of a valve connected to by-pass said flow restricting means; and means responsive to the rate of relative movement between said first and second member and connected to said valve to move said valve towards an open position at an increase in the rate of such movement.

21. In a shock absorber the combination with a first member; a second member movable relatively thereto and arranged to displace in response to such movement through a passage a body of pressure fluid; and fluid flow restricting means in said passage, of a valve connected to by-pass said flow restricting means; and means responsive to the rate of flow of fluid through said passage and connected to said valve to move said valve towards an open position at an increase in the rate of such flow.

22. A shock absorber comprising, in combination, a cylinder; a piston movable therein and dividing the cylinder into two chambers; a charge of pressure fluid in said chambers; a conduit connecting said two chambers; a flow restricting member in said conduit; and means responsive to the rate of movement of said piston relatively to said cylinder, said means being connected to vary the flow resistance of said member in response to such rate of movement.

23. A shock absorber comprising, in combination, a cylinder; a piston movable therein and dividing the cylinder into two chambers; a charge of pressure fluid in said chambers; a conduit connecting said two chambers; a flow restricting member in said conduit; and means responsive to the rate of movement of said piston relatively to said cylinder, said means being connected to decrease the flow resistance of said member at an increase in the rate of such movement.

24. A shock absorber comprising, in combination, a cylinder; a piston movable therein; a source of fluid under pressure; first control means responsive to the relative position of said cylinder and piston connected to admit pressure fluid from said source into said cylinder in response to such relative position; a constricted passage; second control means responsive to the relative position of said cylinder and piston connected to vent pressure fluid from said cylinder through said passage; a storage chamber adapted to store fluid under pressure; a constricted conduit connecting said cylinder to said storage chamber; and means responsive to the rate of relative movement of said piston relatively to said cylinder, said means being connected to vary the flow resistance of said conduit in response to such rate of movement.

25. A shock absorber comprising, in combination, a cylinder; a piston movable therein; a source of fluid under pressure; first control means responsive to the relative position of said cylinder and piston connected to admit pressure fluid from said source into said cylinder in response to such relative position; a constricted passage; second control means responsive to the relative position of said cylinder and piston connected to vent pressure fluid from said cylinder through said passage; a storage chamber adapted to store fluid under pressure; a constricted conduit connecting said cylinder to said storage chamber; and means responsive to the rate of relative movement of said piston relatively to said cylinder, said means being connected to decrease the flow resistance of said conduit at an increase in the rate of such movement.

26. A shock absorber comprising, in combination, a cylinder; a piston movable therein; a source of fluid under pressure; a discharge passage; a first control valve connected to be operated in response to the relative position of said cylinder and piston and connected to admit pressure fluid from said source into said cylinder and from said cylinder into said discharge passage; a storage chamber adapted to store fluid under pressure; a conduit connecting said chamber and said cylinder; a constriction in said conduit; a second valve connected to by-pass said constriction; and means responsive to the rate of movement of said piston relatively to said cylinder, said means being connected to actuate said second valve.

PAUL KOLLSMAN.